United States Patent
Brouwer et al.

(12)

(10) Patent No.: US 6,645,316 B1
(45) Date of Patent: Nov. 11, 2003

(54) POST-PASSIVATION OF A PHOSPHATIZED METAL SURFACE

(75) Inventors: Jan-Willem Brouwer, Willich (DE); Peter Kuhm, Hilden (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/980,532

(22) PCT Filed: May 19, 2000

(86) PCT No.: PCT/EP00/04528

§ 371 (c)(1),
(2), (4) Date: Nov. 28, 2001

(87) PCT Pub. No.: WO00/73536

PCT Pub. Date: Dec. 7, 2000

(30) Foreign Application Priority Data

May 28, 1999 (DE) .......................... 199 24 656
Dec. 7, 1999 (DE) .......................... 199 58 775

(51) Int. Cl.$^7$ .............................................. C23C 22/07
(52) U.S. Cl. .................. 148/253; 148/254; 148/255; 148/256; 148/262; 148/273; 427/419.1; 427/419.3; 210/688; 210/805
(58) Field of Search ................... 148/253, 254, 148/255, 256, 262, 273; 427/419.1, 419.3; 210/688, 805

(56) References Cited

U.S. PATENT DOCUMENTS

| 3,647,568 A |   | 3/1972  | Larson ................. 148/6.15 |
| 4,292,096 A |   | 9/1981  | Murakami et al. ....... 148/6.15 |
| 4,419,147 A |   | 12/1983 | Murakami et al. ....... 148/31.5 |
| 4,419,199 A | * | 12/1983 | Hauffe et al. .......... 204/486 |
| 4,600,447 A |   | 7/1986  | Opitz et al. ........... 148/6.15 |
| 5,261,973 A | * | 11/1993 | Sienkowski et al. ...... 148/262 |
| 5,919,318 A |   | 7/1999  | Brands et al. .......... 148/260 |

FOREIGN PATENT DOCUMENTS

| DE | 705 067     | 5/1941  |
| DE | 34 00 339   | 8/1985  |
| DE | 44 17 965   | 11/1995 |
| DE | 199 18 713  | 11/2000 |
| EP | 0 012 695   | 6/1980  |
| EP | 0 149 720   | 7/1985  |
| FR | 2 449 135   | 9/1980  |
| JP | 55 041930   | 3/1980  |
| JP | 01 168880   | 7/1989  |
| WO | WO 95/21587 | 11/1995 |
| WO | WO 98/56963 | 12/1998 |

OTHER PUBLICATIONS

Patent Abstracts of Japan, vol. 004, No. 077 (C–013), of JP 55 041930 (Mar. 25, 1980).
Chemical Abstracts, vol. 112, No. 22, Abstract No. 202820j, p. 265, XP000157063 of JP 01 168880 (Jul. 4, 1989).

* cited by examiner

*Primary Examiner*—John Sheehan
*Assistant Examiner*—Andrew L. Oltmans
(74) *Attorney, Agent, or Firm*—Stephen D. Harper; Glenn E. J. Murphy

(57) ABSTRACT

A process for post-passivation of a phosphated metal surface, characterized in that the phosphated metal surface is treated with an aqueous post-passivation solution which contains from 50 to 500 mg/l of nickel ions and from 200 to 1500 mg/l of phosphate ions. Rinsing water arising which contains constituents of the post-passivation solution may be processed by nanofiltration or reverse osmosis, the retentate being transferred into the phosphating bath, thereby closing the Ni circuit. The post-passivation solution preferably additionally contains a phosphating accelerator.

14 Claims, No Drawings

POST-PASSIVATION OF A PHOSPHATIZED METAL SURFACE

CROSS-REFERENCE TO RELATED APPLICATIONS

This application is the U.S. National Stage application filed under 35 U.S.C. §371 of International Application No. PCT/EP00/04528, filed May 19, 2000, in the European Patent Office, claiming priority under 35 U.S.C. §§119 and 365 of PCT/EP00/04528 and both DE 199 24 656.4, filed on May 28, 1999, and DE 199 58 775.2, filed on Dec. 7, 1999, in the German Patent Office.

This invention relates to a process for post-passivation of a phosphated metal surface and thus falls within the general area of phosphating of metals. The process may be used to treat phosphatable metal surfaces, for example surfaces made from steel, galvanized or alloy-galvanized steel, aluminum, aluminized or alloy-aluminized steel. A preferred embodiment of the process contemplates that active components, such as divalent metal ions and phosphate ions, are concentrated by membrane filtration (nanofiltration, reverse osmosis) out of the post-passivation solution overflow or out of the rinsing water subsequent to post-passivation and transferred into the phosphating solution.

Phosphating, which precedes the post-passivation process according to the present invention, may be carried out as layer-forming or non layer-forming phosphating. In the case of non layer-forming phosphating, also known as iron phosphating, the phosphating solution does not contain any cations, which are incorporated into the generally X-ray amorphous phosphate and oxide layer which is being formed. Instead, the protective layer on the metal surfaces produced by non layer-forming phosphating contains only cations, which originate from the metal surface itself. Non layer-forming phosphating processes of this type are known from the prior art, for example from DE-A-44 17 965.

Non layer-forming phosphating is suitable for use as pretreatment prior to lacquer coating of metal articles of which no excessively stringent requirements are specified with regard to corrosion resistance. Examples thereof are agricultural machinery, as well as domestic appliances, such as refrigerators and washing machines, and pieces of steel equipment.

Layer-forming phosphating is commonly used as a pretreatment prior to lacquer coating of metal articles of which higher demands are made with regard to corrosion protection, such as automotive bodywork. In this embodiment, crystalline metal phosphate layers are generally deposited. The treatment solution for layer-forming phosphating contains cations which are incorporated into the phosphate layer. Particular examples are zinc ions and manganese and/or nickel ions.

The aim of layer-forming phosphating of metals is to produce on the metal surface strongly adhering metal phosphate layers which in themselves improve corrosion resistance and, in conjunction with lacquers and other organic coatings, contribute towards a substantial increase in adhesion and resistance to creepage on exposure to corrosion. Such phosphating processes have long been known in the art. Low-zinc phosphating processes, in which the phosphating solutions have relatively low contents of zinc ions of, for example, 0.5 to 2 g/l, are particularly suitable for pretreatment prior to lacquer coating. An essential parameter of these low-zinc phosphating baths is the weight ratio of phosphate ions to zinc ions, which is usually in a range >12 and may be up to 30.

It has been found that phosphate layers having distinctly improved corrosion protection and lacquer adhesion properties may be formed by also using polyvalent cations other than zinc in the phosphating baths. For example, low-zinc processes with the addition of, for example, 0.5 to 1.5 g/l of manganese ions and, for example, 0.3 to 2.0 g/l of nickel ions are widely used as so-called trication processes for preparing metal surfaces for lacquer coating, for example for cathodic electrocoating of automotive bodywork.

Prior to phosphating, in particular prior to layer-forming phosphating, the metal articles, such as automotive bodywork, are generally cleaned and activated in an activating bath, which conventionally contains colloidal titanium phosphate particles, for subsequent phosphating. After this cleaning and prior to activation or phosphating, the metal articles are conventionally rinsed with water. The phosphating stage is generally followed by post-passivation, the purpose of which is to improve further the corrosion protection obtained by phosphating. Examples of suitable post-passivation solutions are acidic chromate-containing solutions. However, the use of chromate-containing post-passivation solutions is problematic from the point of view of environmental protection and industrial safety. There has, therefore, been no shortage of attempts to find post-passivation solutions for the post-treatment of phosphated metal surfaces, which do not exhibit the disadvantages of chromate-containing solutions. Post-passivation solutions currently used in practice are those which contain as the active components thereof polyvinyl phenol compounds, hexafluorotitanates or zirconates and/or copper ions. The post-passivation solutions thus generally contain active components which are not used in the phosphating solution itself. It is therefore necessary in practice to take care that components of the post-passivation solution are not entrained into the phosphating solution.

It is known from DE-A-34 00 339 to use nickel-containing solutions for the post-passivation of phosphate layers. The nickel salt used is preferably the acetate. However, acetate ions should not be entrained into the phosphating solution, since, once therein, they become acetic acid and cause a severe odor nuisance.

In contrast, an object of the present invention is to provide a post-passivation solution which contains only active components which are also used in a phosphating solution. This is one facet of the broader object of minimizing the active substances used in the overall phosphating process and restricting water consumption.

DESCRIPTION OF THE INVENTION

The present invention relates to a process for post-passivation of a phosphated metal surface, characterized in that the phosphated metal surface is treated with an aqueous post-passivation solution which contains from 50 to 500 mg/l of nickel ions and from 200 to 1500 mg/l of phosphate ions.

Treatment of the phosphated metal surface with the post-passivation solution may be effected in such a way that the phosphated metal surface is sprayed with the post-passivation solution or dipped in the post-passivation solution. The post-passivation solution preferably contains a larger proportion, by weight, of phosphate ions than of nickel ions. The anions of phosphoric acid present in the post-passivation solution are treated for the purposes of calculation as if they were present wholly as tertiary phosphate ions. In actual fact, however, the corresponding protolysis equilibrium of the phosphate ions is established depending on the pH of the post-passivation solution. Since the pH of the post-passivation solution is preferably between 3 and 6 and in particular between 3.5 and 4.5, in practice the anions of phosphoric acid are present extensively as dihydrogen phosphate ions. For calculation of the weight ratios, this may however in practice be disregarded, since the mass of the protons contributes very little to the total mass of the anions of the phosphoric acid. It is preferable for such a weight ratio between nickel ions and phosphate ions to be established that the mass of the phosphate ions amounts to 2 to 5 times the mass of the nickel ions.

The process according to the present invention is preferably carried out in such a way that the aqueous post-passivation solution exhibits a temperature of between about 10 and about 50° C. The temperature is preferably between 15 and 30° C. The post-passivation solution may, for example, be at room temperature, i.e. a temperature between 18 and 25° C.

The phosphated metal surface is contacted with the aqueous post-passivation solution preferably for a period of from about 10 seconds to about 5 minutes, in particular between about 30 seconds and 2 minutes. This means that the metal surface is dipped in the post-passivation solution or sprayed therewith or both procedures are carried out one after the other. The phosphated, post-passivated metal surfaces are then rinsed with water. Completely deionized water is preferably used for this purpose.

The process according to the present invention may be used for post-passivation subsequent to non layer-forming phosphating. Accordingly, one embodiment of the present invention contemplates that the phosphated metal surface is a metal surface which has been phosphated using a non layer-forming phosphating process.

However, the process according to the present invention is particularly designed to be used for post-passivation of a metal surface which has been phosphated using a layer-forming zinc-phosphating process and which therefore exhibits a crystalline metal phosphate layer. The mass per unit area of this crystalline metal phosphate layer is generally between about 1 and about 3 $g/m^3$. Accordingly, another embodiment of the present invention relates to a process for post-passivation of a phosphated metal surface, wherein the phosphated metal surface is a metal surface which has been phosphated using a layer-forming zinc-phosphating process. A low-zinc process may in particular be considered for this purpose. A phosphating process of this type comprises the following features, for example:

The zinc contents are preferably from 0.4 to 2 g/l and in particular 0.5 to 1.5 g/l. The weight ratio of phosphate ions to zinc ions in the phosphating baths may vary within broad limits, providing that it is between 3.7 and 30. A weight ratio of between 10 and 20 is particularly preferred.

In addition to the zinc and phosphate ions, the phosphating bath may contain further components currently conventional in phosphating baths. In particular, 0.01 to 2.5 g/l, preferably 0.3 to 2.0 g/l, of nickel ions may additionally be present. In addition, the phosphating solution, as is conventional in trication processes, may contain 0.1 to 4 g/l, in particular 0.5 to 1.5 g/l, of manganese ions. Moreover, in addition to the zinc ions and optionally together with the nickel and/or manganese ions, the phosphating solution may additionally comprise as further metal ions:

0.2 to 2.5 g/l magnesium(II),
0.2 to 2.5 g/l calcium(II),
0.1 to 2 g/l cobalt(II).

The process is particularly suitable for the post-passivation of a metal surface which has been phosphated with a nickel-containing zinc-phosphating solution. This makes possible the preferred embodiment of the present invention described below, in which nickel and phosphate ions from the post-passivation solution are finally transferred into the phosphating solution. In this way, savings may be made of raw materials and, if the process is implemented appropriately, also water.

The form in which the cations are introduced into the phosphating baths is in principle immaterial. Oxides and/or carbonates constitute particularly convenient sources of cations. Owing to the risk of salting of the phosphating baths, salts of acids other than phosphoric acid should preferably be avoided.

In phosphating baths which are intended to be suitable for different substrates, it has become conventional to add free and/or complexed fluoride in quantities of up to 2.5 g/l total fluoride, up to 750 mg/l of which as free fluoride, calculated respectively as $F^-$. In the absence of fluoride, the aluminum content of the bath should not exceed 3 mg/l. In the presence of fluoride, owing to complexation, higher Al contents may be tolerated, provided that the concentration of non-complexed Al does not exceed 3 mg/l.

In addition to the layer-forming divalent cations, phosphating baths generally contain sodium, potassium and/or ammonium ions for establishing the free acid content.

Phosphating baths used exclusively for the treatment of galvanized material do not necessarily have to contain a so-called accelerator. However, accelerators required for phosphating ungalvanized steel surfaces are frequently also used in the art in phosphating galvanized material. Phosphating solutions containing accelerators have the additional advantage that they are suitable for both galvanized and ungalvanized materials. This is particularly important in phosphating automotive bodywork, since this frequently contains both galvanized and ungalvanized surfaces.

Various accelerators are known in the art for use in phosphating baths. They accelerate layer formation and facilitate the formation of continuous phosphate layers, since they react with the hydrogen arising from the pickling reaction. This process is known as "depolarization". Hydrogen bubbles, which disturb layer formation, are thereby prevented from forming at the metal surface.

The phosphating solution may, for example, contain one or more of the following accelerators:

0.3 to 4 g/l chlorate ions
0.01 to 0.2 g/l nitrite ions
0.1 to 10 g/l hydroxylamine
0.001 to 0.15 g/l hydrogen peroxide in free or bound form
0.5 to 80 g/l nitrate ions.

Hydrogen peroxide may advantageously be used as accelerator together with or instead of chlorate ions. This may be used as is or in the form of compounds which provide hydrogen peroxide under phosphating bath conditions.

An accelerator, the use of which is similarly preferred in the context of the process according to the present invention, is hydroxylamine. This may be added to the phosphating bath in free form or in the form of hydroxylammonium phosphates, hydroxylammonium nitrate and/or hydroxylammonium sulfate.

In one embodiment of the present invention, rinsing water, which arises after post-passivation, is transferred into the post-passivation solution. This has the advantage, on the one hand, that nickel-containing rinsing water does not have to be processed and disposed of and, on the other hand, that the active substances of the post-passivation solution rinsed off the metal surface are returned to the solution. If the post-passivation solution is excessively diluted by recirculation of the rinsing water, it must be ensured that the effective concentration range is maintained by addition of nickel and/or phosphate ions.

Recirculation of the rinsing water into the post-passivation solution will in time cause the tank or storage vessel containing the post-passivation solution to overflow. The procedure which is then preferably implemented is continuously or discontinuously to subject part of the post-passivation solution to nanofiltration or reverse osmosis, wherein the retentate (=concentrate) from the nanofiltration or reverse osmosis is transferred into the phosphating solution, with which the metal surface is phosphated prior to post-passivation. This procedure has the advantage that overflowing post-passivation solution does not have to be disposed of as waste water. Instead, through membrane filtration (nanofiltration or reverse osmosis) the active substances nickel and phosphate from the post-passivation solution are concentrated and transferred into the phosphating solution, where they once again constitute active substances. This is particularly the case when the phosphating solution is a layer-forming, nickel-containing zinc-phosphating solution. In this way, the nickel ion circuit is closed, such that the nickel ions leave the overall phosphating plant only through incorporation into the zinc phosphate layer. Nickel-containing waste water continues to occur at most to the small extent to which nickel ions may penetrate the nanofiltration or reverse osmosis membrane and be discharged with the permeate.

A further embodiment of the process according to the present invention contemplates rinsing the phosphated metal surface with water between phosphating and treatment with the post-passivation solution, treating it with the post-passivation solution and rinsing it with water again after treatment with the post-passivation solution. In this embodiment, it is advantageous for the rinsing water from rinsing after post-passivation to be transferred into the rinsing water for rinsing prior to post-passivation. The used rinsing water after post-passivation does not therefore constitute waste water, but rather is re-used as rinsing water prior to post-passivation. This recirculation of the rinsing water results in overflowing of the bath or the storage vessel for the rinsing water prior to post-passivation. For this embodiment, provision is preferably therefore made for part of the rinsing water used for rinsing between phosphating and post-passivation to be subjected continuously or discontinuously to nanofiltration or reverse osmosis. The procedure then followed is as in the above-described embodiment: the retentate (=concentrate) from the nanofiltration or reverse osmosis is transferred into the phosphating solution, with which the metal surface is phosphated prior to post-passivation. Thus, in this embodiment too, the nickel ion circuit is substantially closed, since the nickel ions from post-passivation are returned in the end to the phosphating bath, where they are incorporated into the crystalline zinc phosphate layer. Only a small amount of nickel leaves the system in the nanofiltration or reverse osmosis permeate.

Where general mention is made in the above of "rinsing", it is meant that rinsing may be carried out by dipping of the treated metal articles in a bath containing rinsing water or by spraying of the treated metal articles with rinsing water. Combinations thereof are also possible. For example, the articles may initially be pre-rinsed by dipping and then post-rinsed by spraying.

If nanofiltration or reverse osmosis are used to process the post-passivation solution and/or used or surplus rinsing water, a permeate is obtained which contains only about 0.5 to 3 ppm of nickel ions. If the permeate is to be disposed of, the nickel ions may be precipitated using alkali. However, the permeate may also be further cleaned by ion exchangers. In this way, it is possible to bind a proportion of the nickel in the ion exchanger. After elution of the exchanger, the recovered proportion of nickel ions is returned once again to the phosphating bath. This sub-stage of permeate processing is described in more detail in German Patent Application 199 18 713.4.

Another variant of the process provides for the membrane filtration permeate to be used either directly or after post-treatment with an ion exchanger for rinsing the metal surfaces to be phosphated after cleaning (degreasing) and prior to phosphating. This procedure optimizes the overall process to the effect that not only the nickel ions but also the rinsing water are returned to the phosphating circuit. In this way, the phosphating plant may be operated in a manner which produces a particularly small amount of waste water. Nickel-containing waste water arises only in a very reduced amount, such that it is possible to benefit from the advantages of nickel-containing zinc-phosphating processes without the problems involved in treating nickel-containing waste water.

A further development of the process described above contemplates adding additional substances to the post-passivation solution which are known as phosphating accelerators. In this way, the corrosion protection properties of the post-passivated phosphate layer on the metal surface are improved further.

Accordingly, in a further embodiment of the process according to the present invention, the post-passivation solution additionally contains one or more phosphating accelerators selected from 0.05 to 2 g/l m-nitrobenzene sulfonate ions, 0.1 to 10 g/l hydroxylamine in free or bound form, 0.05 to 2 g/l m-nitrobenzoate ions 0.05 to 2 g/l p-nitrophenol, 1 to 70 mg/l hydrogen peroxide in free or bound form, 0.05 to 10 g/l organic N-oxides 0.1 to 3 g/l nitroguanidine 1 to 500 mg/l nitrite ions 0.5 to 5 g/l chlorate ions.

In this respect, it is particularly advantageous for the post-passivation solution to contain the same phosphating accelerator(s) as the phosphating solution used to produce the phosphated metal surface. In the case of the above-described processing of rinsing water by reverse osmosis or nanofiltration and recirculation of the concentrate into the phosphating bath, only those substances then enter the phosphating solution which contribute to the functionality thereof: nickel ions, phosphate ions and molecules or ions of the accelerator. In the case of the rinsing water processing described, therefore, only useful materials enter the phosphating solution, and no extraneous substances.

In a particularly preferred embodiment of the present invention, the post-passivation solution and the phosphating solution contain as accelerator hydroxylamine in free form or in the form of hydroxylammonium phosphates, hydroxylammonium nitrates and/or hydroxylammonium sulfates.

EXAMPLE 1

The post-passivation process according to the present invention was tested using phosphated steel sheets. To this end, in accordance with a procedure conventional in practice, steel sheets were firstly cleaned with an alkaline cleaner, rinsed and activated with a titanium phosphate-containing activating agent and phosphated using a conventional trication zinc-phosphating solution.

The phosphating solution had the following composition:

| | |
|---|---|
| Zn | 1.1 g/l |
| Mn | 0.8 g/l |
| Ni | 0.8 g/l |
| $H_2PO_4^-$ | 15 g/l |
| $SiF_6^{2-}$ | 0.2 g/l |
| Na | 2.6 g/l |
| $NO_3^-$ | 6 g/l |
| $NO_2^-$ | 0.1 g/l | free acid (determined by titration to pH 3.6): 0.9 points total acid (determined by titration to pH 8.5): 21 points 2 minutes spraying at 52°C.

After phosphating, the sheets were rinsed and post-rinsed either using a nickel phosphate-containing solution or, for the purpose of comparison, using completely deionized water.

The post-passivation solution had the following composition:

| | |
|---|---|
| $Ni^{2+}$ | 140 mg/l |
| $H_2PO_4^-$ | 500 mg/l |
| pH 4.0. | |

A solution of this type may be produced by dissolving 0.067 wt. % of 75% phosphoric acid and 0.031 wt. % of nickel carbonate (92%) in completely deionized water.

Post-passivation was effected by spraying the phosphated test sheets with the post-passivation solution at room temperature for a period of 1 minute.

After post-passivation, the sheets were post-rinsed using completely deionized water, dried and lacquer coated using a cathodic electrocoating lacquer (FT 85-7042, BASF).

The phosphated, post-passivated test sheets and the non post-passivated comparison sheets were subjected to an alternating climatic conditions test in accordance with VDA 621-415 and to a stone impact test in accordance with VW standard P3.17.1 in each case for 10 cycles. The alternating climatic conditions test was used to evaluate lacquer creepage (half scribe width) and the stone impact test was used to evaluate the K value. In this test, the higher is the K value, the worse is the degree of lacquer scaling.

Results: lacquer creepage post-passivated 0.9 mm, non post-passivated 1.2 mm; K value: post-passivated 7, non post-passivated 8.

EXAMPLE 2

In a second series of tests, the steel test sheets were phosphated using a commercially available trication phosphating solution containing hydroxylamine as the accelerator. The following procedure was performed by spraying:

| 1. | Cleaning using Ridoline ® 1561 (Henkel KGaA) | |
|---|---|---|
| | Formulation | 1.0% |
| | Temperature | 55° C. |
| | Time | 2 minutes |
| 2. | Rinsing | |

| 3. | Activation using Fixodine ® C 9112 (Henkel KGaA) | |
|---|---|---|
| | Formulation | 0.1% in completely deionized water |
| | Temperature | Room temperature |
| | Time | 1 minute |
| 4. | Phosphating using Granodine ® 1993 (Henkel KGaA) | |
| | Formulation | as per operating instructions |
| | Temperature | 52° C. |
| | Time | 2 minutes |
| | Free acid | 0.7 points (to pH 3.6/10 ml initial amount) |
| | Total acid | 23.0 points (to pH 8.5/10 ml initial amount) |
| | $NH_2OH$ | 0.8 g/l |
| | Zn | 1.1 g/l |
| | Mn | 0.6 g/l |
| | Ni | 0.6 g/l |
| | $H_2PO_4^-$ | 15.0 g/l |
| | $SiFE_6^{2-}$ | 1.0 g/l |
| | $Na^+$ | 2.6 g/l |
| | $NO_3^-$ | 6.0 g/l |
| 5. | Rinsing | |
| 6. | Alternative post-rinsing A, B or C | |
| | A. Post rinsing using completely deionized water (comparison) | |
| | B. Post-passivation on basis of nickel phosphate | |
| | Formulation: raw materials:$H_3PO_4$ - 75%:0.39% in completely deionized water | |
| | $NiCO_3$ - 92% | 0.031% |
| | $Ni^{2+}$ | 140 ppm |
| | $H_2PO_4^-$ | 2900 ppm |
| | pH | 4.0 (adjusted using sodium carbonate solution) |
| | Temperature | room temperature |
| | Time | 1 minute |
| | C. Accelerated post-passivation on basis of nickel phosphate | |
| | Charge: raw materials:$H_3PO_4$ - 75%:0.39% in completely deionized water | |
| | $NiCO_3$ - 92% | 0.031% |
| | $NH_2OH$ | 0.08% |
| | $Ni^{2+}$ | 140 ppm |
| | $H_2PO_4^-$ | 2900 ppm |
| | $NH_2OH$ | 0.8 g/l |
| | pH | 4.0 |
| | Temperature | room temperature |
| | Time | 1 minute |

7. Rinsing using completely deionized water
8. Drying
Lacquer coating: KTL: FT 85-7042 (BASF)
Corrosion tests: alternating climatic conditions test VDA 621-415+VW stone impact test P3.17.1: 10 cycles

| | Creepage U/2 (mm) | VW stone impact Test K values |
|---|---|---|
| Granodine 1993 Post-rinsing completely deionized water (A) | 1.2 | 8 |
| Granodine 1993 Post-passivation on basis of nickel phosphate (B) | 0.9 | 7 |
| Granodine 1993 Post-passivation on basis of $NH_2OH$ and nickel phosphate (C) | 0.7 | 6 |

Used or surplus rinsing water together with surplus post-passivation solution may be further treated by nanofiltration or reverse osmosis. Various types of membrane are provided in the prior art for nanofiltration or reverse osmosis. Since the treatment solutions and also the corresponding rinsing water react acidically, the membrane used should be acid stable. Examples of suitable membranes are inorganic membranes, such as ceramic membranes. In addition, organic polymer membranes may be used. A polyamide membrane is particularly suitable as a nanofiltration membrane.

A Desal DK membrane is suitable for the nanofiltration stage, for example. At a pressure difference of 7 bar and a temperature of 35° C., it delivers, for a ratio, by volume, of concentrate to filtrate of 1:1, a membrane flow of the order of 35 to 40 l per $m^2$ per hour. For the reverse osmosis stage, a Filmtec SW 30 membrane made by Rochem may be used, for example. At a pressure difference of 25 bar and a temperature of 45° C., it produces, for a ratio, by volume, of concentrate to filtrate of 5:1, a membrane flow of about 30 l per $m^2$ per hour.

The membrane filtration retentate (concentrate) may be returned to the phosphating bath. Residual nickel may be removed from the permeate (filtrate) by a weakly acidic ion exchanger. The type of weakly acidic ion exchanger used is preferably one which is selective for nickel ions and Optionally zinc ions. In contrast, monovalent cations should be bound as little as possible. Weakly acidic ion exchangers particularly suitable for this purpose are those which carry chelate-forming iminodiacetic acid groups. A suitable product is Lewatit TP 207 made by Bayer.

The process is then preferably performed in such a way that, once laden, the weakly acidic ion exchanger is regenerated using a strong acid. The selectively bound cations are eluted and may be re-used for phosphating purposes. By using the process according to the present invention, these cations do not have to be disposed of as a heavy metal-containing sludge, but rather may, optionally after suitable processing, be re-used for phosphating. This enables resources to be saved. It is particularly preferable to use an acid for regeneration of the laden weakly acidic ion exchanger which constitutes a material of use to the phosphating solution. Phosphoric acid is particularly suitable. Nitric acid may also be used if it is intended that the phosphating solution contain nitrate ions as accelerators or as co-accelerators.

The regenerated material may then be re-used immediately or after replenishment with further active substances to replenish a phosphating solution. It is particularly preferable for the regenerated material to be replenished with further zinc and/or nickel ions, together with further active substances of a phosphating solution in such a way that a conventional replenishing solution for a phosphating bath is obtained. This replenishing solution may then be used in the conventional manner to replenish the phosphating bath.

The cation-depleted solution which leaves the weakly acidic cation exchanger in the loading phase thereof may, depending on content, be fed to a simplified waste water treatment or directly to a biological water purification plant. It is more economical, however, to use this solution as rinsing water for the metal articles to be phosphated after degreasing thereof. This embodiment of the process according to the present invention has the additional advantage that rinsing water is saved.

In Example 2, the rinsing water from after post-phosphating was transferred into the rinsing stage after phosphating and the rinsing water from after phosphating was processed by nanofiltration. The test parameters and results of nanofiltration are as follows:

| B. Post-passivation on basis of nickel phosphate | | |
|---|---|---|
| | Post-passivation | Post-passivation rinsing water |
| $Ni^{2+}$ | 140 ppm | 7 ppm |
| $H_2PO_4^-$ | 2900 ppm | 145 ppm |
| $Na^+$ | 570 ppm | 28 ppm |
| pH | 4.0 | not measured |

| C. Post-passivation on basis of nickel phosphate and hydroxylamine | | |
|---|---|---|
| | Post-passivation | Post-passivation rinsing water |
| $Ni^{2+}$ | 140 ppm | 7 ppm |
| $H_2PO_4^-$ | 2900 ppm | 145 ppm |
| $Na_2OH$ | 800 ppm | 40 ppm |
| pH | 4.0 | not measured |

Post-passivation rinsing water is transferred into the rinsing stage after phosphating (400 l/h). Rinsing water after phosphating (400 l/h) contains:

| | B. Post-passivation on basis of nickel phosphate | C. Post-passivation on basis of nickel phosphate and hydroxylamine |
|---|---|---|
| $Zn^{2+}$ | 60 mg/l | 60 mg/l |
| $Ni^{2+}$ | 37 mg/l | 37 mg/l |
| $Na^+$ | 158 mg/l | 130 mg/l |
| $H_2PO_4^-$ | 895 mg/l | 895 mg/l |
| $NO_3^-$ | 300 mg/l | 300 mg/l |
| $NH_2OH$ | 40 mg/l | 80 mg/l |
| org. constituents | 10 mg C/l | 10 mg C/l |
| sludge | 0.05 g/l | 0.05 g/l |

Rinsing water processing: 400 l/h

| I. | Sludge removal by bag filtration | |
|---|---|---|
| | Filter: Lofclear ® 523 D manufactured by Loeffler GmbH | |
| | Particle size | Sludge removal |
| | <1.5 microns | 95% |
| | <2.5 microns | 99% |
| | <5.5 microns | 99.9% |

II. Removal of Organic Constituents by Activated Carbon or Synthetic Resins (e.g. Lewatit® VP OC 1066 or Dowex® OPTL 285) /

Activated carbon: Lofsorb® LA 40 E-3-01: 22 filter cartridges manufactured by Loeffler GmbH Organic constituent residue: 35–45%

III. Nanofiltration

Operating Conditions

Desal D5 membrane

Pressure difference: 12 bar

Temperature: 30° C.

Membrane flow: 20 l/$m^2$.h

Volume ratio: concentrate/filtrate: 8:1

Result

|  | Concentrate | Filtrate |
| --- | --- | --- |
| B. Post-passivation on basis of nickel phosphate | | |
| $Zn^{2+}$ (mg/l) | 506 | 2.6 |
| $Mn^{2+}$ (mg/l) | 204 | 1.0 |
| $Ni^{2+}$ (mg/l) | 270 | 1.2 |
| $Na^+$ (mg/l) | 465 | 122 |
| $H_2PO_4^-$ (mg/l) | 2650 | 510 |
| $NO_3^-$ (mg/l) | 605 | 225 |
| $NH_2OH$ | 117 | 29 |
| C. Post-passivation on basis of nickel phosphate and hydroxylamine | | |
| $Zn^{2+}$ (mg/l) | 507 | 2.4 |
| $Mn^{2+}$ (mg/l) | 211 | 1.0 |
| $Ni^{2+}$ (mg/l) | 272 | 1.0 |
| $Na^+$ (mg/l) | 392 | 108 |
| $H_2PO_4^-$ (mg/l) | 2655 | 509 |
| $NO_3^-$ (mg/l) | 604 | 224 |
| $NH_2OH$ | 240 | 61 |

If post-passivation rinsing water is transferred into the rinsing stage after phosphating, no "extraneous substances" accumulate in the phosphating solution when the nanofiltration concentrate is recirculated into the phosphating bath. Only nickel, phosphate and $NH_2OH$ are recirculated.

What is claimed is:

1. A process for post-passivation of a phosphated metal surface, comprising treating a phosphated metal surface that has been treated with a phosphating solution with an aqueous post-passivation solution that comprises from 50 to 500 mg/l of nickel ions and from 200 to 1500 mg/l of phosphate ions, wherein the phosphated metal surface is contacted with the aqueous post-passivation solution and then rinsed with water or an aqueous solution, and:
    (a) wherein at least a part of the used rinsing water or solution from the rinsing step after the post-passivation treatment is added to the post-passivation solution; or
    (b) wherein the phosphated metal surface is rinsed with water or an aqueous solution prior to the post-passivation treatment and is rinsed again with water or an aqueous solution after the post-passivation treatment, and at least part of the used rinsing water or solution from rinsing after post-passivation is added to the rinsing water or solution to be used for rinsing prior to post-passivation.

2. The process of claim 1, wherein the aqueous post-passivation solution has a pH of from 3 to 6.

3. The process of claim where on the aqueous post-passivation solution has a temperature of between 10° C. and 50° C.

4. The process of claim 2, wherein the aqueous post-passivation solution has a temperature of between 10° C. and 50° C.

5. The process of claim 1, wherein the phosphated metal surface is contacted with the aqueous post-passivation solution for a period of 10 seconds to 5 minutes and then rinsed with the water or an aqueous solution.

6. The process of claim 1, wherein the phosphated metal surface has been phosphates using a non layer-forming phosphating process.

7. The process of claim 1 wherein the phosphated metal surface has been phosphated using a layer-forming zinc-phosphating process.

8. The process of claim 1, wherein at least part of the post-passivation solution is subjected continuously or discontinuously to nanofiltration or reverse osmosis to form a permeate and a retentate, the retentate from the nanofiltration or reverse osmosis being added to the phosphating solution.

9. The process of claim 1, wherein at least part of the rinsing water or solution used for rinsing between phosphating and post-passivation is subjected continuously or discontinuously to nanofiltration or reverse osmosis to produce a permeate and a retentate, the retentate being added to the phosphating solution with which the metal surface is phosphated prior to post-passivation.

10. The process of claim 8, wherein the nanofiltration or reverse osmosis permeate is used for rinsing the metal surfaces to be phosphated between cleaning thereof and phosphating thereof.

11. The process of claim 9, wherein the nanofiltration or reverse osmosis permeate is used for rinsing the metal surfaces to be phosphated between cleaning thereof and phosphating thereof.

12. The process of claim 1, wherein the post-passivation solution additionally comprises one or more phosphating accelerators selected from the group consisting of:

0.05 to 2 g/l m-nitrobenzene sulfonate ions;

0.1 to 10 g/l hydroxylamine in free or bound form;

0.05 to 2 g/l m-nitrobenzoate ions;

0.05 to 2 g/l p-nitrophenol;

1 to 70 mg /l hydrogen peroxide in free or bound form;

0.05 to 10 g /l organic N-oxides;

0.1 to 3 g /l nitroguanidine;

1 to 500 mg/l nitrite ions; and 0.5 to 5 g/l chlorate ions.

13. The process of claim 12, wherein the post-passivation solution and the phosphating solution comprise the same phosphating accelerator(s).

14. The process of claim 13, wherein the post-passivation solution and the phosphating solution comprise hydroxylamine in free form or in the form of hydroxylammonium phosphates, hydroxylammonium nitrate and/or hydroxylammonium sulphate.

* * * * *

UNITED STATES PATENT AND TRADEMARK OFFICE
CERTIFICATE OF CORRECTION

PATENT NO. : 6,645,316 B1
DATED : November 11, 2003
INVENTOR(S) : Brouwer et al.

It is certified that error appears in the above-identified patent and that said Letters Patent is hereby corrected as shown below:

Column 11,
Line 49, after "claim", insert -- 1 -- and delete "where on" and insert therefore -- wherein --.

Column 12,
Line 4, delete "phosphates" and insert therefore -- phosphated --.

Signed and Sealed this

Fourteenth Day of December, 2004

JON W. DUDAS
*Director of the United States Patent and Trademark Office*